(12) United States Patent
Tetsuka (10) Patent No.: US 6,572,500 B2
(45) Date of Patent: Jun. 3, 2003

(54) BICYCLE SPROCKET WITH CHAIN SUPPORT PROJECTIONS

(75) Inventor: Toshio Tetsuka, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/859,741

(22) Filed: May 18, 2001

(65) Prior Publication Data

US 2002/0006842 A1 Jan. 17, 2002

Related U.S. Application Data

(60) Provisional application No. 60/215,769, filed on Jun. 30, 2000.

(51) Int. Cl.$^7$ ............................................ F16H 9/06
(52) U.S. Cl. ....................... 474/78; 474/160; 474/162
(58) Field of Search ........................ 474/78, 116, 162, 474/164

(56) References Cited

U.S. PATENT DOCUMENTS

| | | | | |
|---|---|---|---|---|
| 4,493,678 A | * | 1/1985 | Husted ........................ | 474/164 |
| 5,078,653 A | | 1/1992 | Nagano | |
| 5,192,248 A | | 3/1993 | Nagano | |
| 5,413,534 A | | 5/1995 | Nagano | |
| 5,609,536 A | * | 3/1997 | Hsu ............................ | 474/160 |
| 5,738,603 A | * | 4/1998 | Schmidt et al. ............. | 474/158 |
| 5,876,296 A | * | 3/1999 | Hsu et al. .................... | 474/160 |

FOREIGN PATENT DOCUMENTS

| | | |
|---|---|---|
| JP | S54-27719 | 9/1979 |
| JP | H05-58377 | 3/1993 |

OTHER PUBLICATIONS

Shimano Model FC3303 (SORA).

* cited by examiner

*Primary Examiner*—William C Joyce
*Assistant Examiner*—Timothy McAnulty
(74) *Attorney, Agent, or Firm*—Shinjyu Global IP Counselors, LLP (57) ABSTRACT

A sprocket assembly is provided for a bicycle having a large sprocket and a small sprocket. The large sprocket includes one or more chain support projections formed on the side surface opposed to the small sprocket. Each projection includes a contact portion defining a contact surface for contacting, without meshing, a lower end of a chain shifted from the small sprocket to the large sprocket. The projections are arranged on the large sprocket with a size and shape that allows the projections to pass between outer links prior to the gear-changing operation. The chain support projections are arranged for causing the contact surface to contact the chain engaging the small sprocket and pick up the chain radially outwardly of the large sprocket during a chain shift from the small sprocket to the large sprocket.

34 Claims, 10 Drawing Sheets

BICYCLE SPROCKET WITH CHAIN SUPPORT PROJECTIONS

CROSS-REFERENCE TO RELATED APPLICATION

This application claims the benefit of U.S. Provisional Patent Application Ser. No. 60/215,769, filed Jun. 30, 2000. The entire disclosure of U.S. Provisional Patent Application Ser. No. 60/215,769 is hereby incorporated herein by reference.

BACKGROUND OF THE INVENTION

1. Field of the Invention

This invention generally relates to a structure formed on a sprocket to aid in shifting of a bicycle chain. More specifically, the present invention relates to a sprocket assembly with more projections formed on a sprocket to aid in shifting the bicycle chain from a smaller sprocket to a larger sprocket.

2. Background Information

In a multi-stage sprocket assembly of a bicycle having a derailleur, a chain is movable by a shifting force of the derailleur from a small sprocket to a large sprocket. In a conventional sprocket assembly, a side surface of the chain contacts a side surface of the large sprocket, and the chain is supported by the large sprocket through a frictional force produced by the contact. With rotation of the large sprocket, the chain is raised radially outwardly of this sprocket to engage teeth of the sprocket.

However, shifting of the chain in this manner requires a sufficient frictional force produced between the chain and the large sprocket to pick up the chain reliably with rotation of the sprocket. In other words, the derailleur must exert a strong force to press the chain upon the large sprocket.

When a heavy drive load occurs during a shifting operation, the chain may slip from the large sprocket. This makes it very difficult to pick up the chain with the large sprocket, or results in a delay of chain shift. In order to overcome this problem, Shimano Inc., the assignee of this subject application, has developed a sprocket assembly with projections that aid in the shifting of the bicycle chain as disclosed in U.S. Pat. No. 5,413,534 to Nagano. The entire disclosure of U.S. Pat. No. 5,413,534 is hereby incorporated herein by reference. While the sprocket assembly disclosed in this Shimano patent operates very well in shifting the chain from a smaller sprocket to a larger sprocket, the projections on the larger sprocket sometimes causes a slight obstruction during the shifting. In other words, this obstruction caused by the projections can make the gear-changing operation unsteady and produce an unsatisfactory sensation to the rider.

In view of the above, there exists a need for an improved sprocket assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide a sprocket assembly that provides a smooth shifting action between a small sprocket to a large sprocket.

An object of the present invention is to provide a sprocket structure for shifting a chain from a small sprocket to a large sprocket relatively easily, and that reliably even under a heavy drive load.

The foregoing objects of the present invention are basically attained by providing a sprocket assembly with improved projections on the larger sprocket.

The foregoing objects of the present invention can also be attained by providing a sprocket assembly for a bicycle comprising a small sprocket and a large sprocket. The small sprocket has a plurality of circumferentially spaced teeth. The large sprocket has a plurality of circumferentially spaced teeth and at least one first chain support projection located on a side surface of the large sprocket that faces toward the small sprocket. The first chain support projection includes a contact surface for contacting a lower surface of an outer link plate of a chain shifted from the small sprocket to the large sprocket. The first chain support projection is oriented and sized to slip between a pair of adjacent outer link plates. The first chain support projection is disposed adjacent the teeth of the large sprocket to cause the contact surface to contact the chain engaged with the small sprocket and pick up the chain radially outward relative to a center of rotation of the large sprocket during a chain shift from the small sprocket to the large sprocket.

The foregoing objects can also be attained by providing a large sprocket for a bicycle with improved projections. The sprocket comprises a plurality of circumferentially spaced teeth, and at least one first chain support projection located on a side surface of the large sprocket that faces toward an adjacent small sprocket. The first chain support projection includes a contact surface for contacting a lower surface of an outer link plate of a chain shifted from the adjacent small sprocket to the large sprocket. The first chain support projection is oriented and sized to slip between a pair of adjacent outer link plates. The first chain support projection is disposed adjacent the teeth of the large sprocket to cause the contact surface to contact the chain engaged with the adjacent small sprocket and pick up the chain radially outward relative to a center of rotation of the large sprocket during a chain shift from the adjacent small sprocket to the large sprocket.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
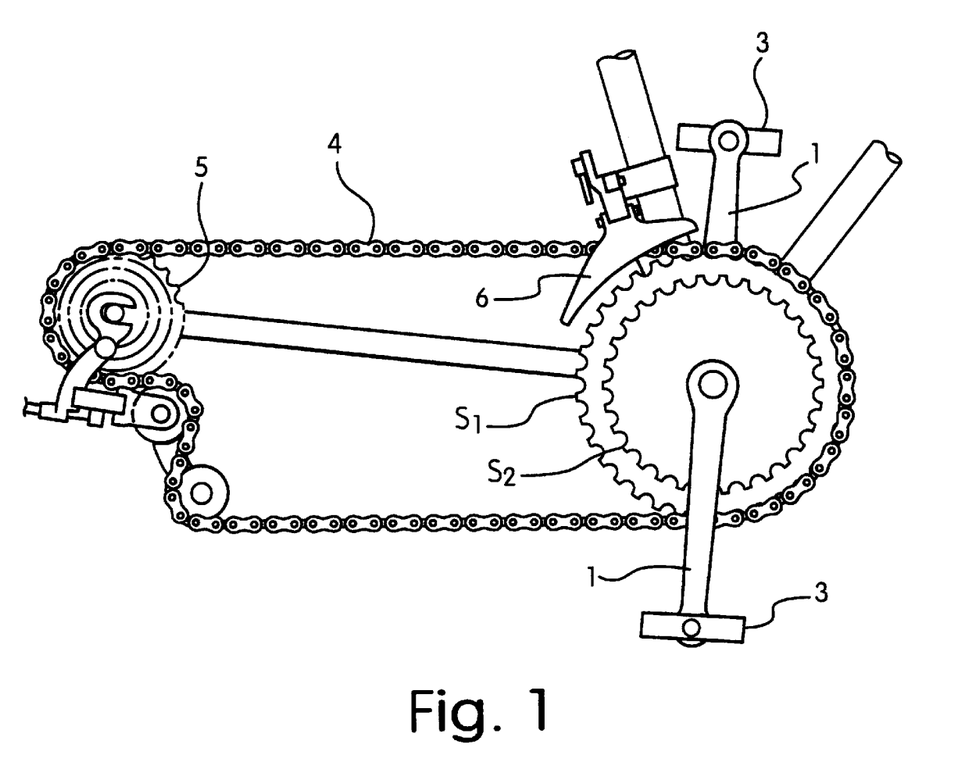
FIG. 1 is a partial side schematic view of a principal portion of a drive train for a bicycle having a two-stage sprocket assembly in accordance with the present invention.

Referring initially to FIG. 1, a principal portion of a drive train of a bicycle having a two multi-stage change speed apparatus is illustrated in accordance with a first embodiment of the present invention. The drawing shows crank arms 1 pivotally supporting pedals 3, a large sprocket S1, a small sprocket S2, a chain 4, a rear sprocket 5, and a front derailleur 6. As in a conventional drive mechanism of a bicycle, the pedals 3 supported by the crank arms 1 are tuned to drive the sprockets S1 and S2, and the drive is transmitted through the chain 4 to the rear sprocket 5. The derailleur 6 is operable to shift the chain 4 from one front sprocket to the other.

Figure 2:
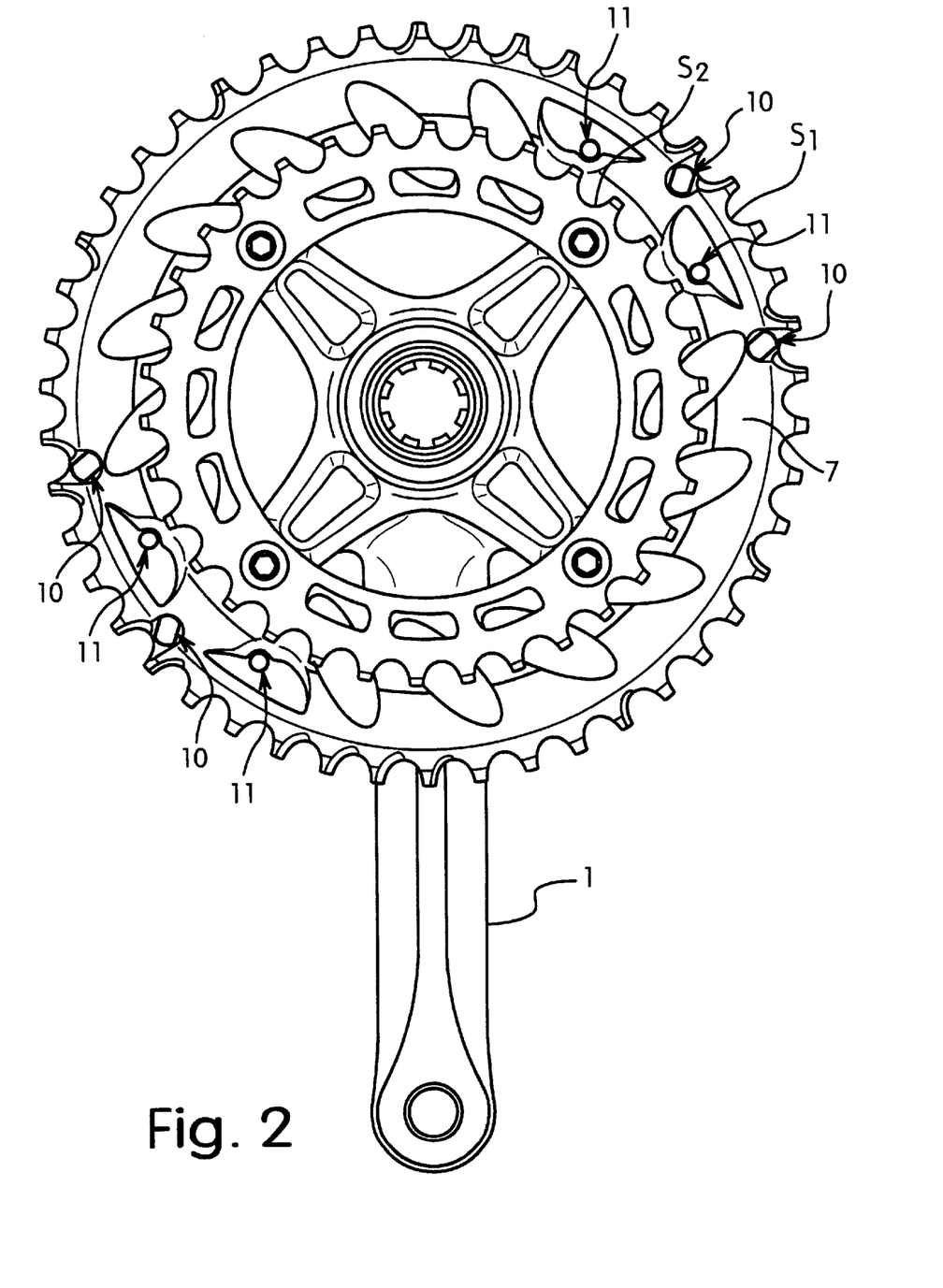
FIG. 2 is an inside elevational view of the sprocket assembly having a chain shift aiding mechanism according to the present invention.
Figure 3:
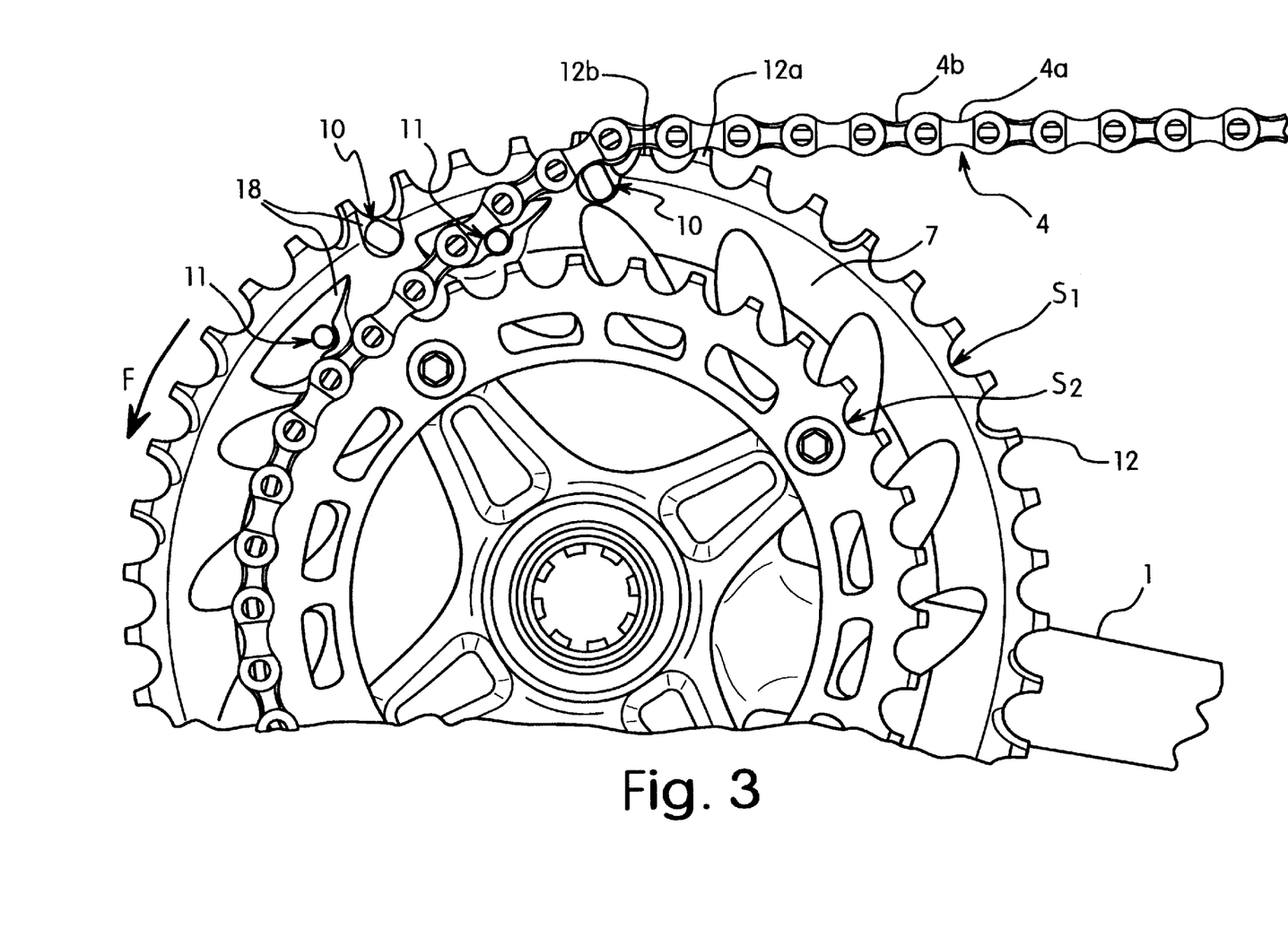
FIG. 3 is an enlarged partial inside elevational view of a principal portion of the sprocket assembly with the chain shift aiding mechanism shown in FIG. 2.

As seen in FIGS. 2 and 3, the illustrated sprocket assembly has a large sprocket S1 and a small sprocket S2 with a chain shift aiding mechanism provided on the large front sprocket S1. This chain shift aiding mechanism aids in shifting of the chain 4 from the small sprocket S2 to the large sprocket S1. The chain shifting aiding mechanism includes a plurality of chain support projections 10 and 11 formed on a side surface 7 of the large sprocket S1 opposed to the small sprocket S2. In other words, the large sprocket S1 includes a plurality (four) of outer chain support projection 10 and a plurality (four) of inner chain support projections 11 formed on a side surface 7 opposed to an intermediate sprocket S2. These projections 10 and 11 allow the chain 4 to be shifted from the intermediate sprocket S2 to the large sprocket S1 easily and reliably.

Figure 7:
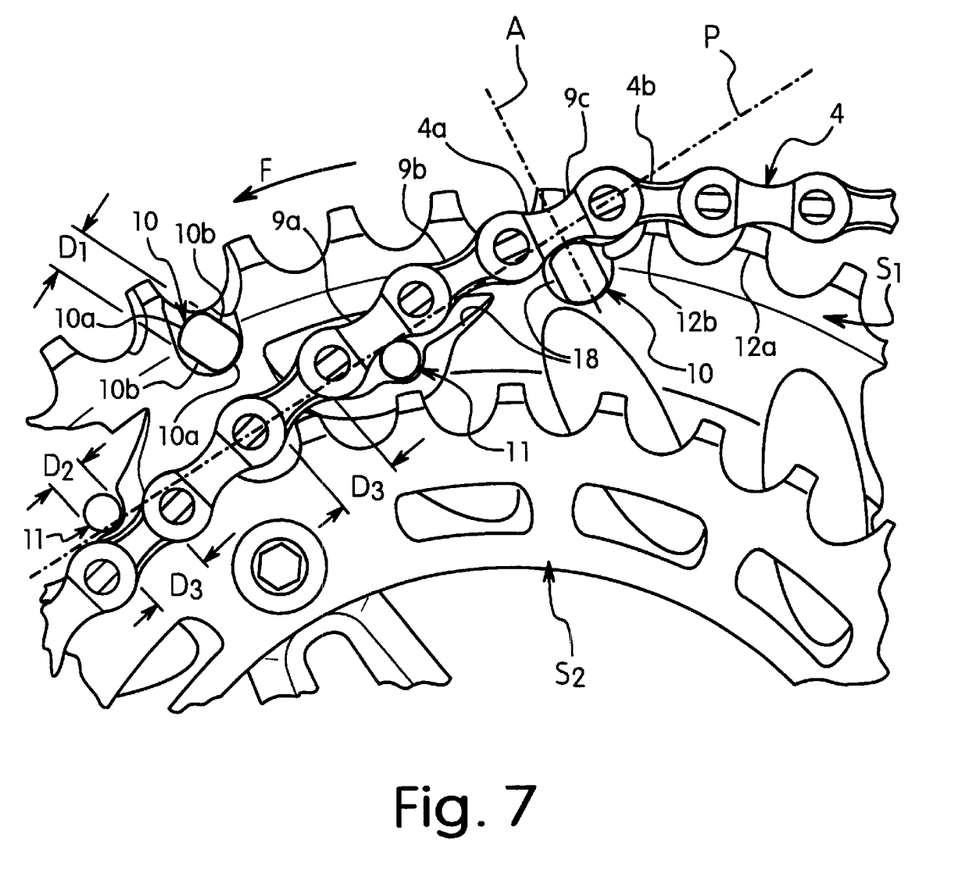
FIG. 7 is an enlarged side elevational view of a portion of the sprocket assembly with the chain engaging the chain shift aiding mechanism of the large sprocket.
Figure 8A:
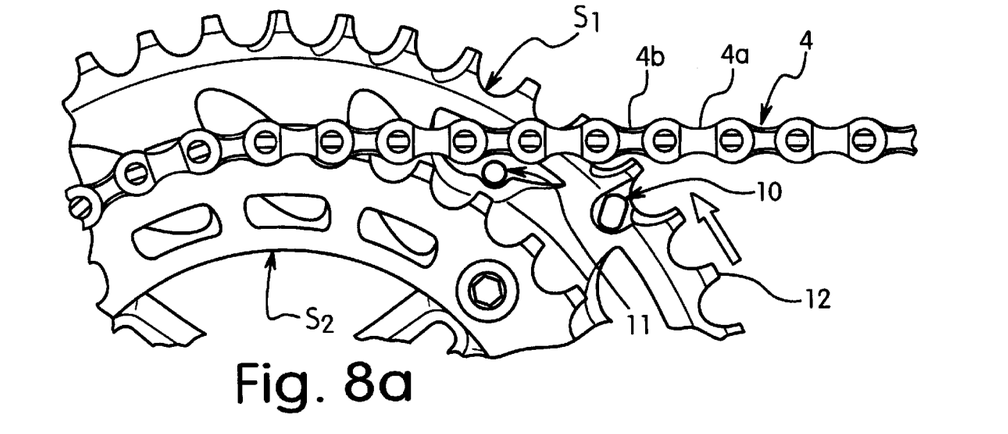
FIG. 8(a) is a schematic view of the sprocket assembly showing the projections aligning with the inner links of the chain during rotation of the sprocket assembly.
Figure 8B:
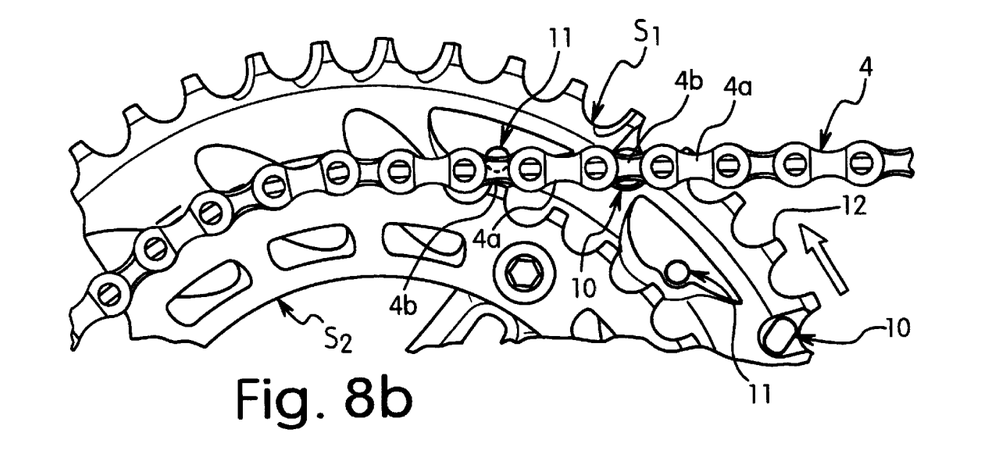
FIG. 8(b) is a schematic view, similar to FIG. 8(a) of the sprocket assembly, showing the projections sliding between the outer links of the chain during rotation of the sprocket assembly.
Figure 8C:
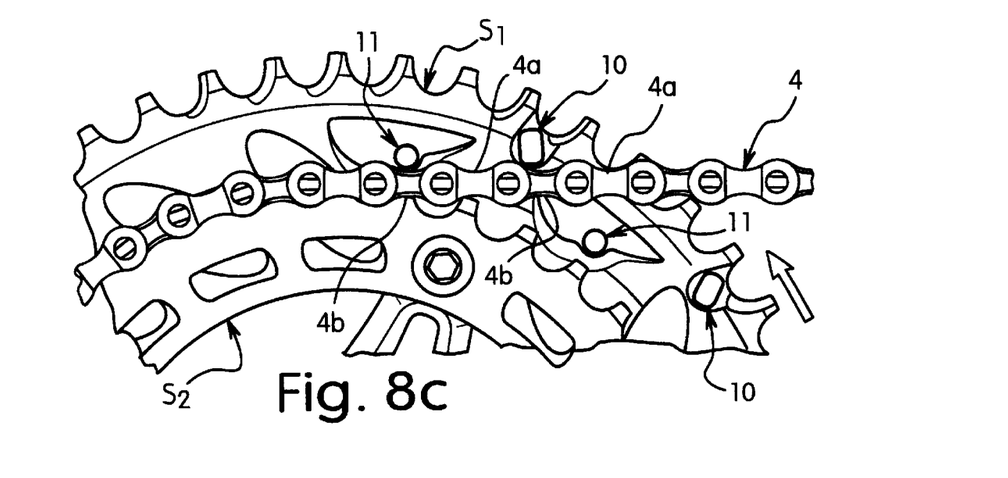
FIG. 8(c) is a schematic view, similar to FIGS. 8(a) and 8(b) of the sprocket assembly, showing the projections after passing the chain during rotation of the sprocket assembly.

In the preferred embodiment, chain support projections 10 are elongated or non-circular members, as viewed in a direction perpendicular to the large sprocket S1, while the chain support projections 11 are substantially circular pins, as viewed in a direction substantially perpendicular to the large sprocket S1. In the preferred embodiment illustrated in the drawings, the outer chain support projections 10 are preferably elongated projections with a pair of convexly curved end contact surfaces 10a and a pair of flat side surfaces 10b. The distance between the curved end contact surfaces 10a forms the length of projection 10, which is preferably approximately 6.0 mm. The distance between the pair of flat side surfaces 10b forms the width of the projection 10, which is preferably approximately 3.9 mm. The longitudinal axis A of projections 10 are substantially perpendicular to the chain plate P as seen in FIG. 7.

Figure 6A:
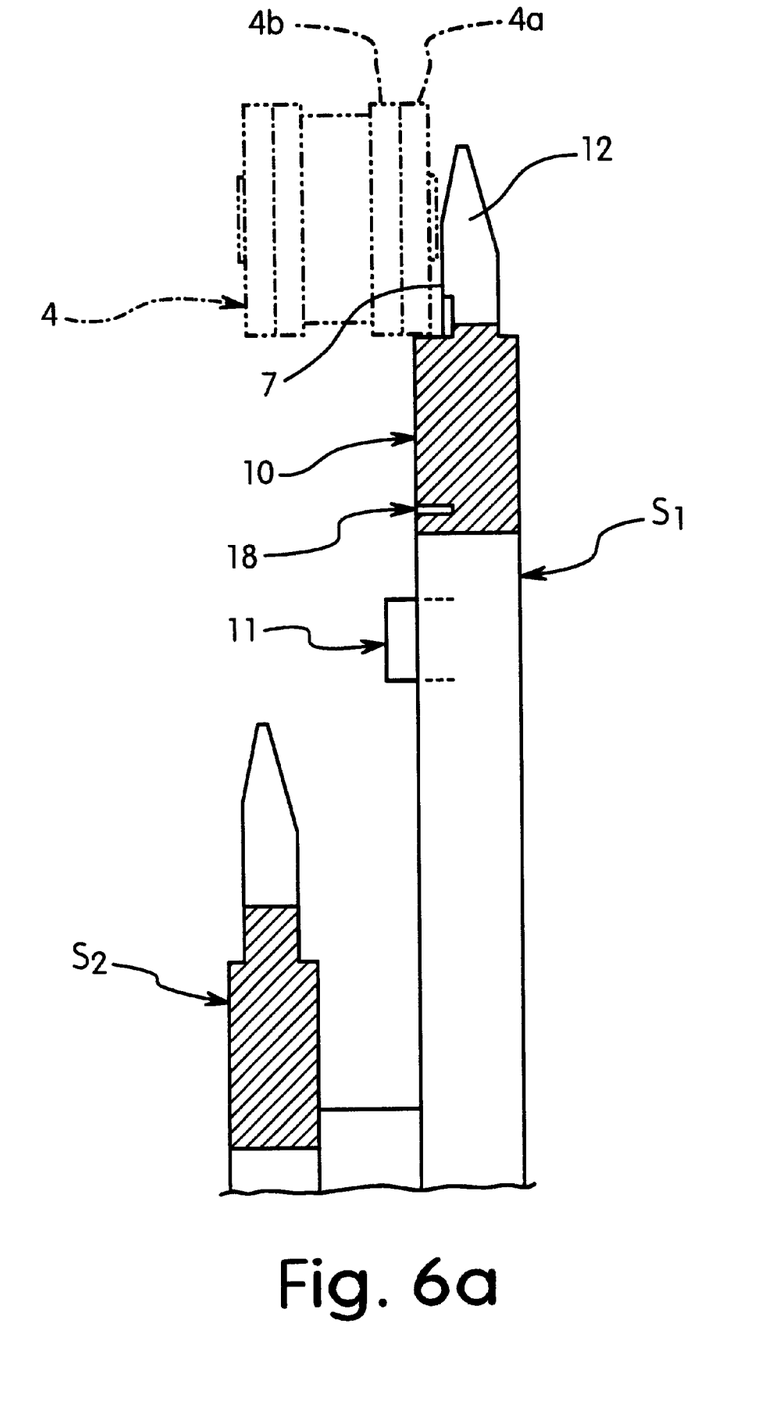
FIG. 6(a) is a schematic cross-sectional view of the sprockets and chain taken on line 6—6 of FIG. 3.

Each of these chain support projections 10 and 11 can be integrally formed with the chain ring of sprocket S1 as seen in FIG. 6(a) or can be fastened to the large sprocket S1 through a rivet or other fastener 8, similar to U.S. Pat. No. 5,413,534, as seen in FIG. 6(b).

Figure 6B:
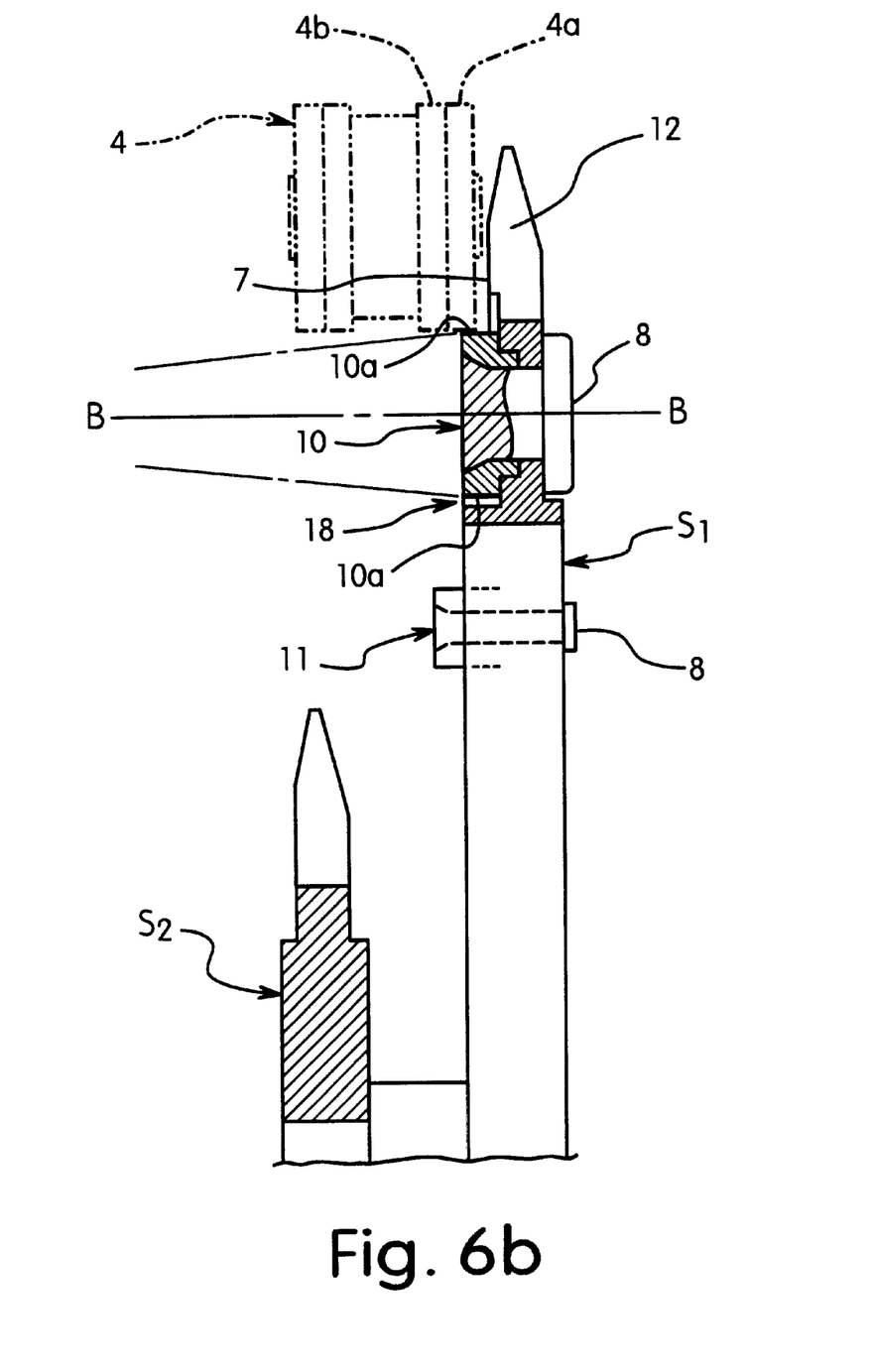
FIG. 6(b) is a schematic cross-sectional view, similar to FIG. 6(a), of the projections riveted to the large sprocket.

As seen in FIG. 6(b), when the projections 10 and 11 are fastened to the large sprocket S1, the edges of the projections can be tapered or inclined towards the large sprocket S1. In the case of the projections 10, the contact surfaces 10a are axially tapered towards the center axes of the projections 10, respectively. For example, FIG. 6(b) shows a center axis B—B of one of the projections 10. In the case of the projections 11, the circumferential outer surfaces are axially tapered towards the center axes of the projections 11, respectively.

As shown in FIG. 2, each of the four outer chain support projections 10 is formed in proximal regions of one of the chain driving teeth 12 of the large sprocket S1. The four inner chain support projections 11 are formed radially inwardly of the four outer chain support projections 10. More specifically, each adjacent pair of outer and inner chain support projections 10 and 11 are located so that the chain path formed by the chain links that contact and extend between projections 10 and 11 is a substantially straight chain path. For example, in the illustrated embodiment, chain links 9a, 9b and 9c that are supported by and between projections 10 and 11 of FIG. 7 to form a substantially straight chain path as compared to the prior art shown in FIG. 13 of U.S. Pat. No. 5,413,534. This straight chain path is due to the radial spacing between projections 10 and 11. More specifically, the inner support projection 11 of the present invention is set at a smaller diameter relative to the inner projection of the prior art patent. Of course, the precise diameters or positions of projections 10 and 11 depend upon the size of the sprocket. In any event, an angle of preferably about 10° or less is formed by the intersection of a first plane passing through the pivot points of link 9a and a second plane passing through the pivot points of link 9c.

As shown in FIGS. 2, 6(a) and 7, the chain support projections 10 and 11 are fitted in recesses 18 formed in the large sprocket S1. This construction is provided in order that the large sprocket S1 and small sprocket S2 have a small distance therebetween although the chain support projections 10 and 11 project to a large extent.

Figure 4A:
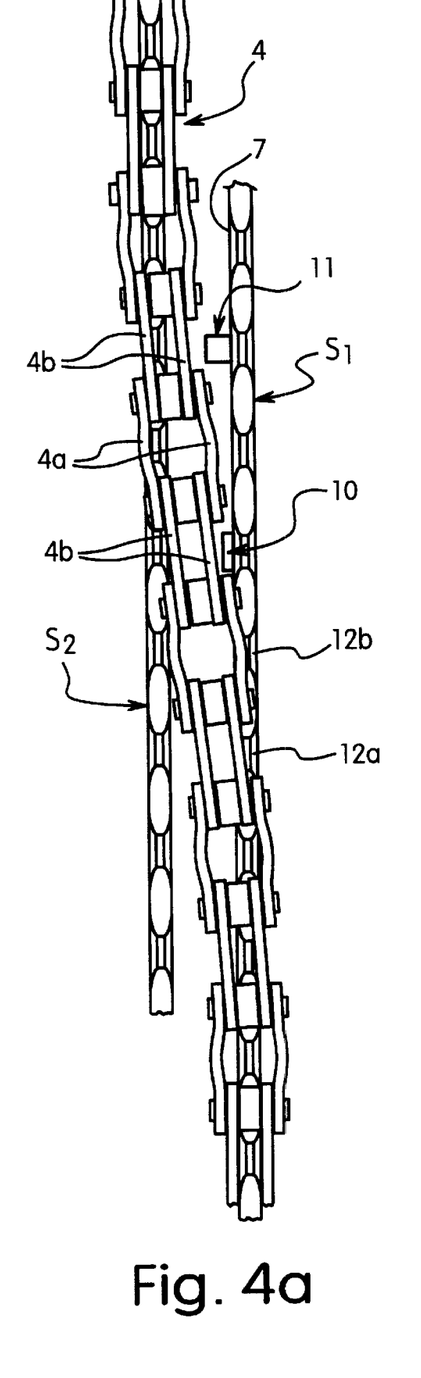
FIG. 4(a) is an overhead schematic view showing a positional relationship between the sprockets and the chain shifted by the derailleur, but prior to the chain engaging the teeth of the large sprocket by the chain shift aiding mechanism shown in FIGS. 2 and 3.

Basically, four pairs of inner and outer chain support projections 10 and 11 are formed on the large sprocket S1. The adjacent pairs of inner and outer chain support projections 10 and 11 are designed such that one pair is arranged to align with the outer chain link plates 4a, while the other pair of inner and outer chain link support portions 10 and 11 are arranged to be aligned with inner chain link plates 4b. In other words, two of the pairs of inner and outer chain support portions 10 and 11 are spaced 180° apart, and align with the outer chain link plates 4a. The other two of the pairs of inner and outer chain support portions 10 and 11 that are 180° apart and align with the inner chain link plates 4b. Stated differently, the outer chain support projections 10 of adjacent pairs of support projections 10 and 11 are spaced apart by a distance that is substantially equal to a length of an odd number (three) of contiguous chain link plates of chain 4. Similarly, the inner chain support projections 11 of adjacent pairs of support projections 10 and 11 are spaced apart by a distance that is substantially equal to a length of an odd number (three) of chain link plates. The inner and outer chain support projections 10 and 11 of each pair of projections 10 and 11 are spaced apart from each other by a distance that is substantially equal to a length of an even number (two) of chain link plates. Thus, the chain support projections 10 and 11 are located either to pass between the outer link plates 4a of the chain 4, or to contact the outer link plates 4a of the chain 4 after the chain 4 has been shifted by the derailleur 6 from the small sprocket S2 to the large sprocket S1. As seen from FIGS. 4(a), 4(b) and 6(a), the chain support projections 10 and 11 are operable only to pick up the chain 4 without meshing with the chain 4.

Figure 5:
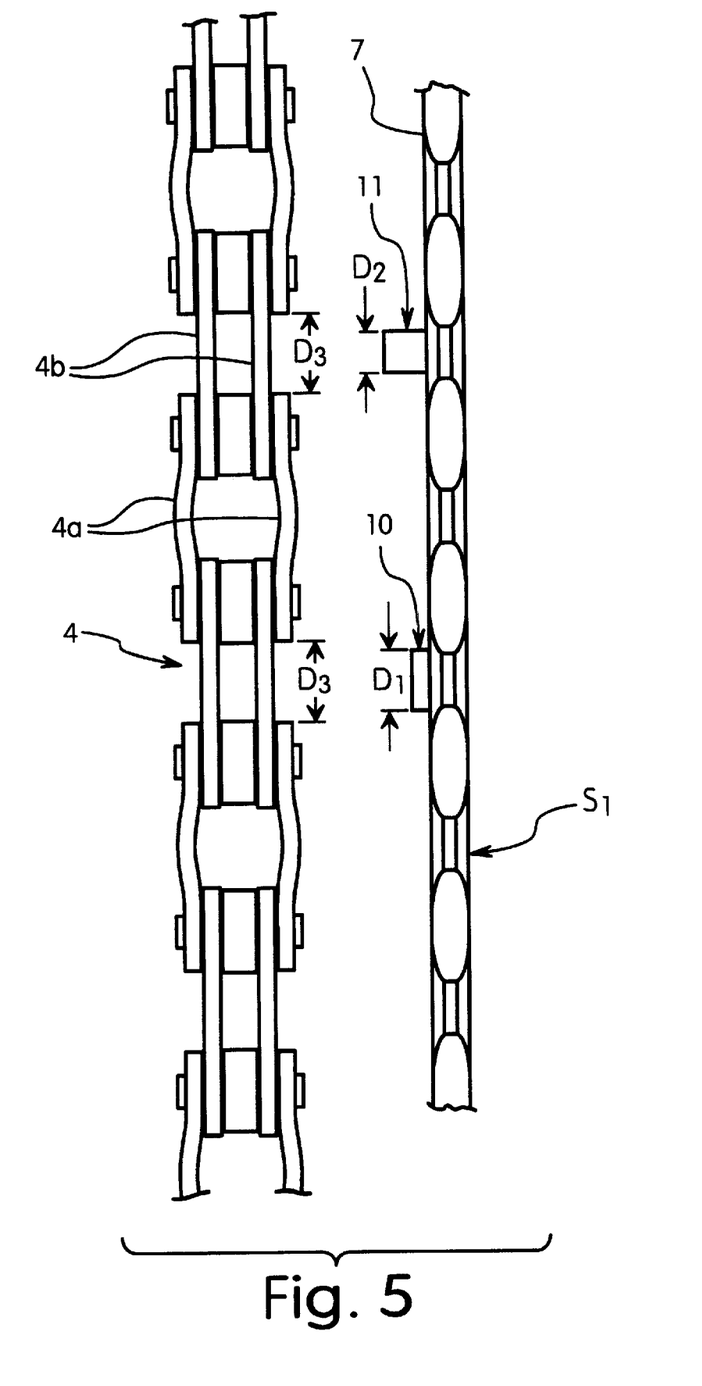
FIG. 5 is an exploded top plan view of a portion of the large sprocket and the chain.

The four chain support projections 11 are preferably located radially inwardly of the four outer chain support projections 10. Moreover, the four inner chain support projections 11 are preferably located circumferentially forward of the four outer chain support projections 10 relative to the driving direction F of rotation of the large sprocket S1. The chain support projections 10 and 11 are sized and shaped such that they can pass between a pair of outer link plates 4a and along the inner link plates 4b without contacting the inner link plates 4b when they are aligned with the inner link plates 4b. In other words, the chain support projections 10 have a width $D_1$ as measured parallel to the chain path P during a gear changing operation. The inner chain support projections 11 have a diameter or width $D_2$ as measured in a direction parallel to the chain path P during a chain gear changing operation. The ends of the adjacent outer link plates 4a are spaced apart by a distance $D_3$, which is larger than the width or diameters $D_1$ and $D_2$ of the chain support projections 10 and 11, respectively, as seen in FIGS. 5 and 7.

The four inner chain support projections 11 are preferably circular in cross-section and smaller than the width $D_1$ of the outer chain support projections 10. Of course, it will be apparent to those skilled in the art from this disclosure that other shapes are possible so long as they carry out the essence of the present invention. The inner chain support projections 11 are positioned near to the chain path P which extends from the small sprocket S2 to the large sprocket S1 for facilitating the gear changing operations 12 a of the larger sprocket S1.

The inner projections 11 are located outside the gear changing operation when the inner link plates 4b are aligned with the inner chain support projections 11. In other words, the inner and outer chain support projections 10 and 11 do not engage the chain 4 when the inner link plates 4b are aligned with the projections 10 and 11. The gear change is completed at the next gear position.

Conventional projections, on the other hand, engage the chain even when the projections are aligned with the inner link. In other words, the projections engage the chain even though they are not aligned in a position for causing a gear changing operation. Thus, in the prior art, the projection causes an obstruction making the gear changing operation unsteady, and produces an unsatisfactory sensation. In the present invention, on the other hand, a smooth gear changing operation is performed by virtue of the shape of the chain support projections 10 and 11 which slip easily between the outer link of the chain and by virtue of the angle of this second projection.

Positions of the chain support projections 10 and 11 are determined according to a size of the chain 4 and shape of driving teeth 12. One of these teeth, e.g. tooth 12a, is the first tooth that the chain 4 begins to engage when the chain 4 contacts one of the support projections 11. Similarly, the chain 4 begins to engage the second drive tooth 12b upon contact with the support projection 10. Thus, the chain support projections 10 and 11 are displaced from the respective drive teeth toward a sprocket axis and in a driving direction F shown in FIG. 3.

As best seen in FIG. 7, the chain path P as used herein means the longitudinal axis of the portion of chain 4 that extends between the roller surface of chain 4 that contacts tooth 12b of the large sprocket S1 and the point where chain 4 leaves the small sprocket S2.

Figure 4B:
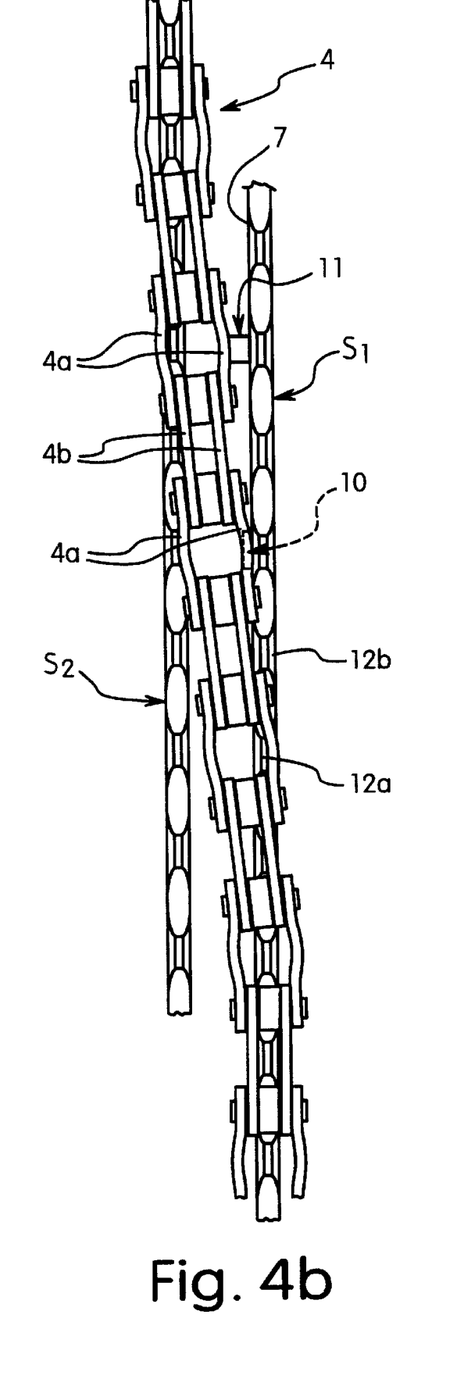
FIG. 4(b) is an overhead schematic plan view showing a positional relationship between the sprocket and the chain after the chain engages a tooth of the large sprocket by the lifting action of the chain shift aiding mechanism shown in FIGS. 2 and 3.

Each of the chain support projections 10 and 11 arranged in the above positions is operable, with rotation of the large sprocket S1, to pick up the chain 4 shifted by the derailleur 6, and move the chain 4 toward one of the drive teeth 12. When the sprockets S1 and S2 are rotated with the derailleur 6 being operated, one of the inner chain support projections 11 and one of the outer chain support projections 10 revolving with the large sprocket S1 move to a position under the chain 4 and contacts pair of outer link plates 4a of the chain 4 as shown in FIGS. 4(b) and 7.

Specifically, rotation of the large sprocket S1 causes one of the inner chain support projections 11 to initially pick up the chain 4 radially outwardly of the large sprocket S1. At this time, the outer chain support projection 10 moves under and engages the raised chain 4 without meshing with the chain 4. By the raising action of the chain support projections 10 and 11 and the shifting action of the derailleur 6, the chain 4 is meshed with a drive tooth 12 of the large sprocket S1 which contacts the chain 4 before any other teeth. In this way, the chain 4 is shifted from the intermediate sprocket S2 to the large sprocket S1 easily and reliably.

With further rotation of the large sprocket S1, the shifting force of the derailleur 6 causes the chain 4 to engage one of the drive teeth 12, and to disengage from the chain support projections 10 and 11. This completes a shift of the chain 4 from the small sprocket S2 to the large sprocket S1.

Position of the inner chain support projections 11 are determined according to a size and shape of the chain 4. As seen from FIG. 2, the inner chain support projections 11 are displaced from the outer chain support projection 10 toward a sprocket axis and in a rotating direction F of the sprockets as shown in FIG. 2.

The outer chain support projections 10 also are disposed in a position determined according to the size and shape of the chain 4. The outer chain support projections 10 are displaced from the drive tooth 12 radially toward the axis of the large sprocket S1 and in the rotating direction F of the sprockets.

The chain support projections 10 and 11 are hardened to be resistant to friction with the chain 4. In the above embodiment, the chain support projections 10 and 11 are integrally formed as part of the large sprocket S1. However, these projections 10 and 11 can be formed as separate components from the large sprocket S1. Preferably the sprocket S1 is formed of steel, with the chain support projections 10 and 11 being embossed by press working the sprocket and hardening the embossed projections to increase wear-resistance. However, as one alternative, the large sprocket S1 can be formed of aluminum. The hardening treatment may be omitted, depending on the wear resistance, hardness and other properties of a material used for forming the sprocket.

Figure 9:
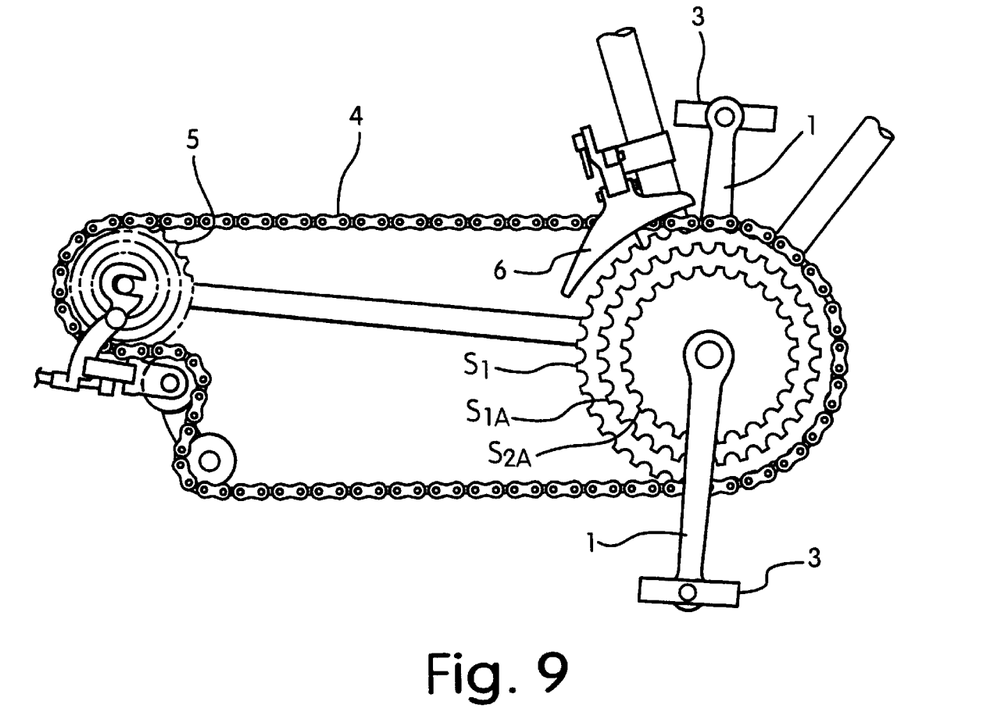
FIG. 9 is a side view of a principal portion of a bicycle having a three-stage sprocket assembly in a further embodiment of the invention.

Another embodiment will be described with reference to FIG. 9, which shows a three-stage sprocket assembly. This sprocket assembly includes a large sprocket S1, an intermediate sprocket S1A and a small sprocket S2A. As in a conventional drive mechanism of a bicycle, crank arms 1 are turned to transmit drive from the sprockets S1, S1A and S2A through a chain 4 to a rear sprocket 5. A derailleur 6 is operable to provide three speeds by shifting the chain 4 among the sprockets S1, S1A and S2A. Basically, in this embodiment, the large sprocket S1 and the intermediate sprocket S1A are both provided with protrusions such as in the first embodiment. In other words, sprocket S1 of this embodiment is identical to the sprocket of one of the first embodiments. The intermediate sprocket S1A is identical to the small sprocket S2 of the first embodiment but has a plurality of protrusions similar to the large sprocket S1. The small sprocket S2A is substantially identical to sprocket S2 of the first embodiment, except that sprocket S2A has a smaller diameter than the sprocket S2 of the first embodiment. In view of the similarities between this embodiment and the first embodiment, this embodiment will not be discussed or illustrated in detail herein.

Whereas in all of the described embodiments, a plurality of chain support projections and a plurality of chain shift teeth are provided, a shifting operation is carried out quickly with increased chances of the chain 4 engaging a chain support projection and chain shift tooth in the course of rotation of the sprockets. In any event, only one chain support projection or chain shift tooth may be provided. Moreover, the chain support projections and chain shift teeth can be provided on the intermediate sprocket only or on both the large sprocket and intermediate sprocket.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A sprocket assembly for a bicycle comprising:
    a small sprocket having a plurality of circumferentially spaced teeth; and
    a large sprocket having a plurality of circumferentially spaced teeth and at least one non-integral first chain support projection fastened thereto and at least one non-integral second chain support projection fastened thereto, said first and second chain support projections being fastened on a side surface of said large sprocket that faces toward said small sprocket,
    said first chain support projection including a contact surface arranged to contact a lower surface of an outer link plate of a chain shifted from said small sprocket to said large sprocket, said first chain support projection being oriented and sized relative to said teeth of said large sprocket to slip between a pair of adjacent outer link plates,
    said first chain support projection being disposed adjacent said teeth of said large sprocket to cause said contact surface to contact the chain engaged with said small sprocket and to pick up the chain radially outward relative to a center of rotation of said large sprocket during a chain shift from said small sprocket to said large sprocket,
    said second chain support projection including a contact surface arranged to contact a lower surface of the chain shifted from said small sprocket to said large sprocket,
    said second chain support projection being located at a smaller diameter position relative to said first chain support projection so that chain links of the chain contacting and between said first and second chain support projections form a substantially straight chain path.
2. The sprocket assembly according to claim 1, wherein said first and second chain support projections extend axially from said large sprocket towards said small sprocket by approximately 1.2 mm.
3. The sprocket assembly according to claim 1, wherein said large sprocket is formed of aluminum.
4. The sprocket assembly according to claim 1, wherein said contact surface of said first chain support projection is a convexly curved surface that is located adjacent one of said teeth of said large sprocket.
5. The sprocket assembly according to claim 1, wherein said first chain support projection is formed as an elongated member with its length having an axis substantially perpendicular to a chain path during a gear changing operation.
6. The sprocket assembly according to claim 1, wherein said first chain support projection has a non-circular projection as viewed in a direction perpendicular to said large sprocket.
7. The sprocket assembly according to claim 6, wherein said first chain support projection has a length that is greater than its width.
8. The sprocket assembly according to claim 7, wherein said first chain support projection has a pair of substantially flat surfaces defining said width of said first chain support projection.
9. The sprocket assembly according to claim 7, wherein said length of said first chain support projection is approximately 6.0 mm, and said width of said first chain support projection is approximately 3.9 mm.
10. The sprocket assembly according to claim 9, wherein said first and second chain support projections extend axially from said large sprocket towards said small sprocket by approximately 1.2 mm.
11. The sprocket assembly according to claim 7, wherein said first chain support projection has a pair of substantially convexly curved surfaces defining said length.
12. The sprocket assembly according to claim 11, wherein said first chain support projection has a pair of substantially flat surfaces defining said width of said first chain support projection.
13. The sprocket assembly according to claim 12, wherein said first chain support projection extend axially from said large sprocket towards said small sprocket by approximately 1.2 mm, said length of said first chain support projection is approximately 6.0 mm, and said width of said first chain support projection is approximately 3.9 mm.
14. The sprocket assembly according to claim 1, wherein said contact surface of said first chain support projection is inclined in an axial direction of said large sprocket.

15. The sprocket assembly according to claim 1, wherein said first and second chain support projections are spaced apart by a distance that is substantially equal to a length of an even number of chain link plates.

16. The sprocket assembly according to claim 1, wherein said large sprocket includes a plurality of said first and second chain support projections.

17. The sprocket assembly according to claim 1, wherein said large sprocket includes four pairs of said first and second chain support projections.

18. A large sprocket for a bicycle comprising:
a plurality of circumferentially spaced teeth;
at least one non-integral first chain support projection fastened on a side surface of said large sprocket that faces toward an adjacent small sprocket, said first chain support projection including a contact surface arranged to contact a lower surface of an outer link plate of a chain shifted from the adjacent small sprocket to said large sprocket, said first chain support projection being oriented and sized to slip between a pair of adjacent outer link plates; and
at least one non-integral second chain support projection fastened on said side surface of said large sprocket that faces toward said small sprocket, said second chain support projection including a contact portion defining a contact surface for contacting a lower surface of the chain shifted from said small sprocket to said large sprocket, said second chain support projection having its center located radially inward relative to said first chain support projection,
said first chain support projection being disposed adjacent said teeth of said large sprocket to cause said contact surface to contact the chain engaged with the adjacent small sprocket and pick up the chain radially outward relative to a center of rotation of said large sprocket during a chain shift from the adjacent small sprocket to said large sprocket,
said second chain support projection being located at a smaller diameter position relative to said first chain support projection so that chain links of the chain contacting and between said first and second chain support projections form a substantially straight chain path.

19. The large sprocket according to claim 18, wherein said first and second chain support projections extend axially from said large sprocket by approximately 1.2 mm.

20. The large sprocket according to claim 18, wherein said large sprocket is formed of aluminum.

21. The large sprocket according to claim 18, wherein said contact surface of said first chain support projection is a convexly curved surface that is located adjacent one of said teeth of said large sprocket.

22. The large sprocket according to claim 18, wherein said first chain support projection is formed as an elongated member with its length having an axis substantially perpendicular to a chain path during a gear changing operation.

23. The large sprocket according to claim 18, wherein said first chain support projection has a non-circular projection as viewed in a direction perpendicular to said large sprocket.

24. The large sprocket according to claim 23, wherein said first chain support projection has a length that is greater than its width.

25. The large sprocket according to claim 24, wherein said length of said first chain support projection is approximately 6.0 mm, and said width of said first chain support projection is approximately 3.9 mm.

26. The large sprocket according to claim 25, wherein said first chain support projection has a pair of substantially flat surfaces defining said width of said first chain support projection.

27. The large sprocket according to claim 26, wherein said first chain support projection has a pair of substantially convexly curved surfaces defining said length of said first chain support projection.

28. The large sprocket according to claim 22, wherein said contact surface of said first chain support projection is inclined in an axial direction of said large sprocket.

29. The large sprocket according to claim 22, wherein said first and second chain support projections are spaced apart by a distance that is substantially equal to a length of an even number of chain link plates.

30. The large sprocket according to claim 22, wherein said large sprocket includes a plurality of said first and second chain support projections.

31. The large sprocket according to claim 22, wherein said large sprocket includes four pairs of said first and second chain support projections.

32. The large sprocket according to claim 22, wherein said second chain support projection has a circular configuration as viewed in a direction perpendicular to said large sprocket.

33. A sprocket assembly for a bicycle comprising:
a small sprocket having a plurality of circumferentially spaced teeth; and
a large sprocket having a plurality of circumferentially spaced teeth and at least one non-integral first chain support projection fastened thereto and at least one non-integral second chain support projection fastened thereto, said first and second chain support projections being fastened on a side surface of said large sprocket that faces toward said small sprocket,
said first chain support projection including a contact surface arranged to contact a lower surface of an outer link plate of a chain shifted from said small sprocket to said large sprocket, said first chain support projection being oriented and sized relative to said teeth of said large sprocket to slip between a pair of adjacent outer link plates,
said first chain support projection being disposed adjacent said teeth of said large sprocket to cause said contact surface to contact the chain engaged with said small sprocket and to pick up the chain radially outward relative to a center of rotation of said large sprocket during a chain shift from said small sprocket to said large sprocket,
said second chain support projection including a contact surface arranged to contact a lower surface of the chain shifted from said small sprocket to said large sprocket,
said second chain support projection being located at a smaller diameter position relative to said first chain support projection so that chain links of the chain contacting and between said first and second chain support projections form a substantially straight chain path, one of said chain links of said chain having a pair of first pivot points and contacting said second chain support projection, another one of said chain links of said chain having a pair of second pivot points and contacting said first chain support projection, a first plane passing through said pair of first pivot points and a second plane passing through said pair of second pivot points, said first plane intersecting said second plane to form an angle of about 10 degrees or less.

34. A large sprocket for a bicycle comprising:

a plurality of circumferentially spaced teeth;

at least one non-integral first chain support projection fastened on a side surface of said large sprocket that faces toward an adjacent small sprocket, said first chain support projection including a contact surface arranged to contact a lower surface of an outer link plate of a chain shifted from the adjacent small sprocket to said large sprocket, said first chain support projection being oriented and sized to slip between a pair of adjacent outer link plates; and at least one non-integral second chain support projection fastened on said side surface of said large sprocket that faces toward said small sprocket, said second chain support projection including a contact portion defining a contact surface for contacting a lower surface of the chain shifted from said small sprocket to said large sprocket, said second chain support projection having its center located radially inward relative to said first chain support projection, said first chain support projection being disposed adjacent said teeth of said large sprocket to cause said contact surface to contact the chain engaged with the adjacent small sprocket and pick up the chain radially outward relative to a center of rotation of said large sprocket during a chain shift from the adjacent small sprocket to said large sprocket, said second chain support projection being located at a smaller diameter position relative to said first chain support projection so that chain links of the chain contacting and between said first and second chain support projections form a substantially straight chain path, one of said chain links of said chain having a pair of first pivot points and contacting said second chain support projection, another one of said chain links of said chain having a pair of second pivot points and contacting said first chain support projection, a first plane passing through said pair of first pivot points and a second plane passing through said pair of second pivot points, said first plane intersecting said second plane to form an angle of about 10 degrees or less.

* * * * *